United States Patent
Liff et al.

(10) Patent No.: US 10,852,495 B2
(45) Date of Patent: Dec. 1, 2020

(54) MICROELECTRONIC PACKAGE COMMUNICATION USING RADIO INTERFACES CONNECTED THROUGH WIRING

(71) Applicant: Intel Corporation, Santa Clara, CA (US)

(72) Inventors: Shawna Liff, Scottsdale, AZ (US); Adel A. Elsherbini, Chandler, AZ (US); Telesphor Kamgaing, Chandler, AZ (US); Sasha N. Oster, Chandler, AZ (US); Gaurav Chawla, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 322 days.

(21) Appl. No.: 15/746,792

(22) PCT Filed: Sep. 25, 2015

(86) PCT No.: PCT/US2015/052495
§ 371 (c)(1),
(2) Date: Jan. 22, 2018

(87) PCT Pub. No.: WO2017/052659
PCT Pub. Date: Mar. 30, 2017

(65) Prior Publication Data
US 2020/0065263 A1 Feb. 27, 2020

(51) Int. Cl.
*G02B 6/42* (2006.01)
*G06F 13/14* (2006.01)
(Continued)

(52) U.S. Cl.
CPC ............ *G02B 6/4249* (2013.01); *G06F 13/00* (2013.01); *G06F 13/14* (2013.01); *H01P 5/00* (2013.01);
(Continued)

(58) Field of Classification Search
CPC .......... G02B 6/4249; H04B 1/40; H04B 7/00; H04M 9/06; H01Q 13/106; H01P 5/00; G06F 13/00; G06F 13/14
See application file for complete search history.

(56) References Cited

U.S. PATENT DOCUMENTS 5,754,948 A 5/1998 Metze
9,647,329 B2 * 5/2017 Herbsommer ........ H01L 23/495
(Continued)

OTHER PUBLICATIONS

International Preliminary Report on Patentability for PCT/US2015/052495 dated Apr. 4, 2018, 12 pages.
(Continued)

*Primary Examiner* — Daniel Petkovsek
(74) *Attorney, Agent, or Firm* — Schwabe, Williamson & Wyatt, P.C.

(57) ABSTRACT

Microelectronic package communication is described using radio interfaces connected through wiring. One example includes a system board, an integrated circuit chip, and a package substrate mounted to the system board to carry the integrated circuit chip, the package substrate having conductive connectors to connect the integrated circuit chip to external components. A radio on the package substrate is coupled to the integrated circuit chip to modulate the data onto a carrier and to transmit the modulated data. A radio on the system board receives the transmitted modulated data and demodulates the received data, and a cable interface is coupled to the system board radio to couple the received demodulated data to a cable.

12 Claims, 7 Drawing Sheets

(51) Int. Cl.
| | |
|---|---|
| H01P 5/00 | (2006.01) |
| H01Q 13/10 | (2006.01) |
| H04B 1/40 | (2015.01) |
| H04B 7/00 | (2006.01) |
| H04M 9/06 | (2006.01) |
| G06F 13/00 | (2006.01) |

(52) U.S. Cl.
CPC ............ *H01Q 13/106* (2013.01); *H04B 1/40* (2013.01); *H04B 7/00* (2013.01); *H04M 9/06* (2013.01)

(56) References Cited

U.S. PATENT DOCUMENTS

| | | | |
|---|---|---|---|
| 10,327,268 B2* | 6/2019 | Kamgaing | H05K 7/1487 |
| 10,452,571 B2* | 10/2019 | Oster | G06F 3/14 |
| 10,483,707 B2* | 11/2019 | Torres | H01R 12/7076 |
| 2011/0068990 A1 | 3/2011 | Grzyb et al. | |
| 2013/0109317 A1 | 5/2013 | Kikuchi et al. | |
| 2014/0285290 A1 | 9/2014 | Payne et al. | |
| 2015/0185425 A1 | 7/2015 | Gundel et al. | |

OTHER PUBLICATIONS

International Search Report and Written Opinion for International Patent Application No. PCT/US2015/052495 dated, Jul. 27, 2016, 17 pgs.

* cited by examiner

MICROELECTRONIC PACKAGE COMMUNICATION USING RADIO INTERFACES CONNECTED THROUGH WIRING

CROSS-REFERENCE TO RELATED APPLICATION

This patent application is a U.S. National Phase Application under 35 U.S.C. § 371 of International Application No. PCT/US2015/052495, filed Sep. 25, 2015, entitled "MICROELECTRONIC PACKAGE COMMUNICATION USING RADIO INTERFACES CONNECTED THROUGH WIRING," which designates the United States of America, the entire disclosure of which is hereby incorporated by reference in its entirety and for all purposes.

FIELD

The present disclosure relates to the field of high speed communications for computer systems and in particular to coupling communication lines to integrated circuit packages using radio interfaces.

BACKGROUND

In many computer systems multiple integrated circuit chips communicate with each other to perform the programmed operations. The different chips may include central processing units, high speed memories, mass storage devices, chipsets, video processors, and input/output interfaces. Some computers may have more than one of each of these kinds of chips. The chips are traditionally packaged and then mounted to a motherboard or system board either directly or through a socket or a daughter card.

The chips traditionally communicate using copper interconnects or links that travel through the chip's package vias, through the socket, through the platform motherboard and then back through the socket and package of the next chip. For servers connected through server backplane a signal may travel from one chip to another server through a package, the socket, the system board and then to a server backplane. There are additional signal interfaces to connect from the server backplane to the signal's destination. These data signal lines also require physical space in the socket and in the system board.

For high performance computing and server platforms the speed of communication between the chip packages and to other peripheral or parallel computing systems may limit the overall system performance. The data computation tends to be faster than the data movement. The socket, traditionally used to connect chips to each other, has a limited data rate due to the many interfaces for a signal to travel from one chip to the next or to a server backplane and due to the length of the signal path.

Some systems use a flexible cable connected directly between two different packages to bypass the socket and the platform motherboard. This provides a more direct path with fewer interfaces through different connections and avoids further routing on the motherboard. Flexible cables with multiple parallel conductors are used to conduct data signals over short distances between CPUs (Central Processing Unit) or between a CPU and another component. The flexible cable is attached directly to the chip packages after the chips are socketed in the system board. The package substrate has a cable connector on one or more edges and a cable is attached to each connector. The cable connects two different chip packages together.

For longer distances an optic fiber interface is used to couple data to and from the chip into an optical fiber to a remote chip. In the same way, the package is first socketed to the system board. The package includes an optical fiber connector on the edge of the package substrate and the optical fibers are connected directly to the package substrate.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

As described herein, a mechanical cable or fiber connector on the package substrate may be avoided. A wireless interconnect, such as a millimeter wave radio and antenna, may be used instead. A millimeter wave wireless interconnect can be coupled into any of a variety of different connectors. As examples, an OPIO (On Package Input/Output) module, such as a flex cable connector or an optical module with an optical connector may be used. These are separate and apart from the package substrate for short to medium range transmissions. A wireless interconnect is smaller than a cable or fiber interface and therefore allows the chip package to be smaller. The wireless interconnect also avoids the thermal, alignment, and socketing issues caused by electrical and optical connectors on the package. The wireless interconnect may also be used to minimize the keep-out zone required on the package.

A millimeter-wave wireless interconnect may be mounted to a package substrate to wirelessly communicate the desired data to and from the package to flexible cable connectors or optical modules on the system board. High data rates are routed from the CPU (Central Processing Unit) to an RF (Radio Frequency) die which is connected to an on-package antenna or radiating element. The data is up-converted to a carrier frequency and sent wirelessly from the package to the flex cable connector or optical module which also has an antenna and down-converting RF circuit. Data can also be sent from the optical module back to the on-package antenna and from there to the CPU. The wireless interconnect may be used to send data to stand-alone memory, a memory die stack, multiple stacked dies of different types, FPGA (Field Programmable Gate Array) modules, graphics modules, CPUs or any of a variety of other individual or commonly packaged components.

The millimeter wave wireless interconnect may be applied to many different system architectures including those with multiple dies or multiple antennas for each cable connector or optical module, or those with other stand-alone modules, such as graphics, FPGAs memory, etc. The radiating element may also have different configurations, such as a single patch antenna, a fixed beam array, a phased array, etc. If the chip package includes a heat spreader or metal lid that covers most of the package then the radiating elements may be formed on the sides of the package.

Server platforms are demanding increased high-speed, high-bandwidth channels between CPUs and with other components on and off a single system board. Taking these signals through a socket into the system board reduces signal integrity and requires space on the die, the package, and the socket. While flex cable connectors or optical interconnects may be used to avoid connecting through the socket and system board, putting optical interconnects directly on the package introduces other problems. The cables must be precisely aligned. The connectors create heat or may be sensitive to heat generated by other dies in the package, such as a CPU. Moving the cable connectors away from the package reduces the amount of heat that the cable experience and must dissipate. The cable connectors and cables require physical space on the package substrate and the cables or fibers must be removed in order to replace the chip package. Removing the cables or optical fibers requires additional time and care and degrades the connectors, adding additional points of failure and increasing the cost of replacing the IC chip package.

The millimeter wave wireless link between the package and the cable or fiber connector allows for high data-rate connections off the package without a significant impact on the size of the package and may also reduce the footprint of the package through disaggregation. It does not require precision alignment and it generates very little heat. In addition, by moving the cable assembly away from the package substrate, the assembly and retention mechanism may be made much more compact. The keep-out zone (KOZ) requirements on the package are also reduced by using the much smaller wireless interface instead of a cable or optic fiber interface.

Since the cable or fiber module does not interact physically with the package, an elegant cable retention and handling mechanism can be designed, reducing the risk of failure and allowing a cleaner platform or system board design. The separate cable or fiber module may also be replaced on failure without impacting the CPU package. The connectors and optical or electrical modules may also be upgraded without affecting the CPU package.

Wireless connections also allow for simpler scaling and reconfiguring. As an example, the wireless modules can be pre-installed on the package since they are low cost. Then the expensive cable or optical fiber modules can be added to the system board during assembly. The particular cable and fiber routing connectors, placement and paths can be optimized for the computer system, system board, chassis and intended application without any impact on the chip package. The same chip package may be applied to many different systems without modification.

Figure 1:
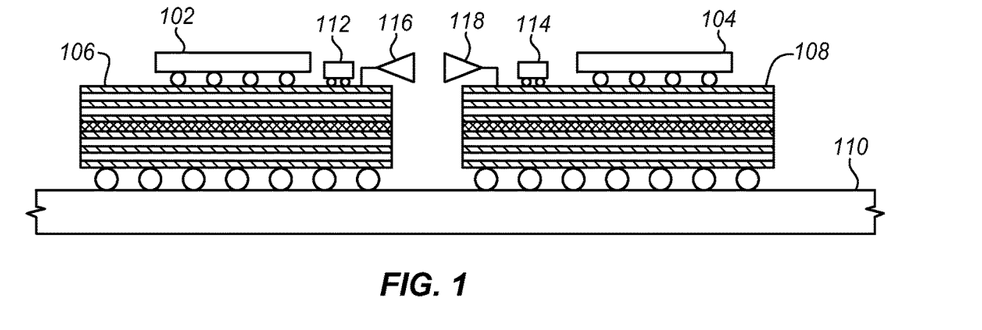
FIG. 1 is a side view cross-sectional diagram of a wireless interconnect for chip-to-chip communications according to an embodiment.

FIG. 1 is a general side view cross-sectional diagram of one example of a wireless interconnect using antennas for chip to chip communication or for free space optics. A first 102 and second 104 chip are each mounted to a respective package 106, 108 using a ball grid array (BGA), land grid array (LGA), or other connection system including pads, wire leads, or other connectors. The packages are mounted to a printed circuit board (PCB) 110, such as a motherboard, system or logic board or daughter card using a solder ball array or any other desired system. The packages 106, 108 are electrically connected to external components, power, and any other desired devices through traces (not shown) on or in the PCB. The chips may also be connected to each other through the PCB. The packages may be mounted to the PCB using sockets (not shown), depending on the particular implementation.

The first and second chip 102, 104 are discussed herein as being central processing units and, in particular, as server CPUs. However, the techniques and configurations described herein may be applied to many different types of chips for which a high speed communications link would be suitable. In some implementations, the chip may include many different functions such as with a SoC (System on a Chip). In other implementations, the chips may be memory, a communications interface hub, a storage device, co-processor or any other desired type of chip. In addition, the two chips may be different so that one may be a CPU and the other may be a memory or a chipset, for example.

Each chip is also connected through the package to a respective radio 112, 114. The radio may be formed of a single die or a package with multiple dies or using another technique. Each radio is mounted to the package near the edge of the package that is near to the other chip. The package may include copper traces, lines, or layers to connect particular lands, pads, or solder balls of the chip to the radio die for data and control signals. The radio die may also be connected to the chip to provide power to the radio die. Alternatively, the radio die may obtain power from an external source through the package connection to the PCB.

An antenna 116, 118 is also mounted to the package and coupled to the radio. Extremely small antennas may be used that are integrated onto or into the package substrate. The antennas are configured so that when the packages are mounted to the PCB, the antennas are directed to each other. The short distance between the antennas allow for a low power and low noise connection between the two chips. The wireless interconnect reduces the complexity of the socket and the complexity of the motherboard for the computing platform.

While different frequencies may be used to suit particular implementations. Millimeter wave and sub-THz frequencies allow for an antenna that is small enough to be integrated on the same package that is normally used for the chip. The antennas may also be constructed using the same materials that are used in the fabrication of the package substrate and still exhibit good electrical performance.

In some embodiments, a server may be constructed with multiple CPUs. Each CPU may be mounted to a package with multiple parallel radio die and antenna sets to provide multiple parallel channels within the server between two CPUs. A small antenna size permitted for millimeter-wave signals allows each antenna of the package for one of the CPUs to be directed to a corresponding antenna on the package for the other CPU. This configuration may be used to combine parallel radio connections and provide Terabit per second data rates.

In some embodiments, a broadband wireless interconnect may be used. For example with a radio operating in a radio frequency range of from 100-140 GHz, the size of each antenna including the keep out zone can be as small as 1.25×1.25 mm to 2.5×2.5 mm. The actual antenna may be still smaller. Considering a typical server CPU package, more than 30 antennas of 1.25×1.25 mm may be placed along one edge of the package. This would allow more than 30 separate links each carrying 40-80 Gb/s each over a short distance. The separate links may all be used to communicate with a single second chip as shown in FIG. 1 or there may be different package antennas placed next to different antennas of the CPU package. This allows the CPU package to communicate with different chips using different links.

In addition to the simple point-to-point connection of FIG. 1, point-to-multi-point transmission may also be provided without using an external switch matrix. The antennas of multiple chip packages may be positioned within range of the antenna or antennas of one of the CPU packages. The multiple chip packages may all receive the same signal from the CPU package at the same time. In order to control which of the multiple chip package receive a transmission, the radio and antenna system may include beam steering.

Figure 2:
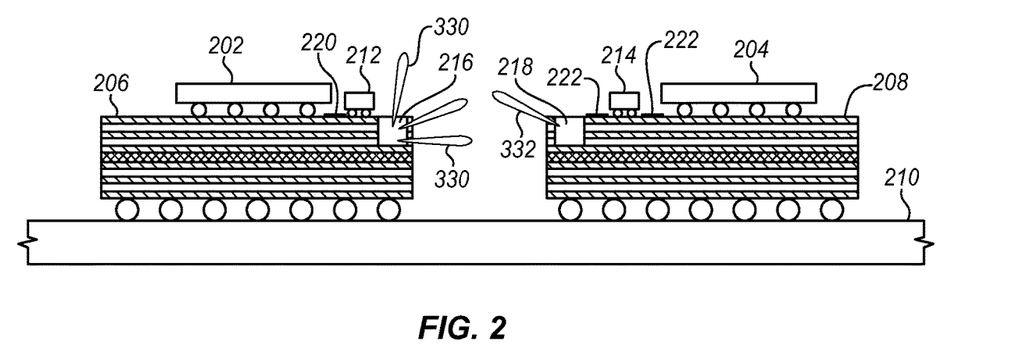
FIG. 2 is a side view cross-sectional diagram of an alternative wireless interconnect for chip-to-chip communications according to an embodiment.

FIG. 2 is a side view cross-sectional diagram of an alternative configuration of a wireless interconnect. As shown a first 202 and a second 204 chip are mounted to respective package substrates 206, 208 which are each mounted to a motherboard 210. Each chip is connected to a respective radio die 212, 214 through its respective package 206, 208. Each radio die 212, 214 is connected to a respective antenna 216, 218. The antennas are positioned to provide a clear and direct wireless connection.

The packaged system may take any of a variety of different forms. One or both of the packages may be a microelectronic module that contains a system on a chip (SoC) or CPU die 202, 204, a millimeter-wave or sub-THz transceiver chip (radio) 212, 214 and an on-package integrated antenna 216, 218. Additional dies and other supporting components such as passives and connectors may also be assembled on the package substrate 206, 208. A SoC die is typically designed and implemented on a low resistivity digital silicon and may also include typical functions found in the baseband portion of a wireless module. If the transceiver or radio die is implemented as a separate die, as shown, then it may be implemented in a high resistivity silicon or on any other type of RF semiconductor substrate including Gallium Arsenide, Gallium Nitride and certain polymers. Alternatively, the radio 212 may be implemented on the primary die 202. A low loss package material processed to have low surface roughness may be used for the package 206 to provide superior electrical performance in the millimeter-wave and sub-THz frequency range. The package materials may include liquid crystal polymers and its derivatives, pre-preg (pre-impregnated fiberglass resin and epoxy), BT (bismaleimide triazine resin epoxy) laminates, other organic substrates, glass, silicon or ceramic.

The wireless interconnect system includes the transceiver chip 206, the on-package antenna 216, 218 and on-package routing 220, 222 to connect the transceiver chip to the main chip and to the antenna. The wireless transmission also uses a wireless receiver on the other package. The receiver system may be a mirror image of the transmitter. For bidirectional transmission, the millimeter-wave/sub-THz transceiver may have both transmit and receive chains.

Figure 3:
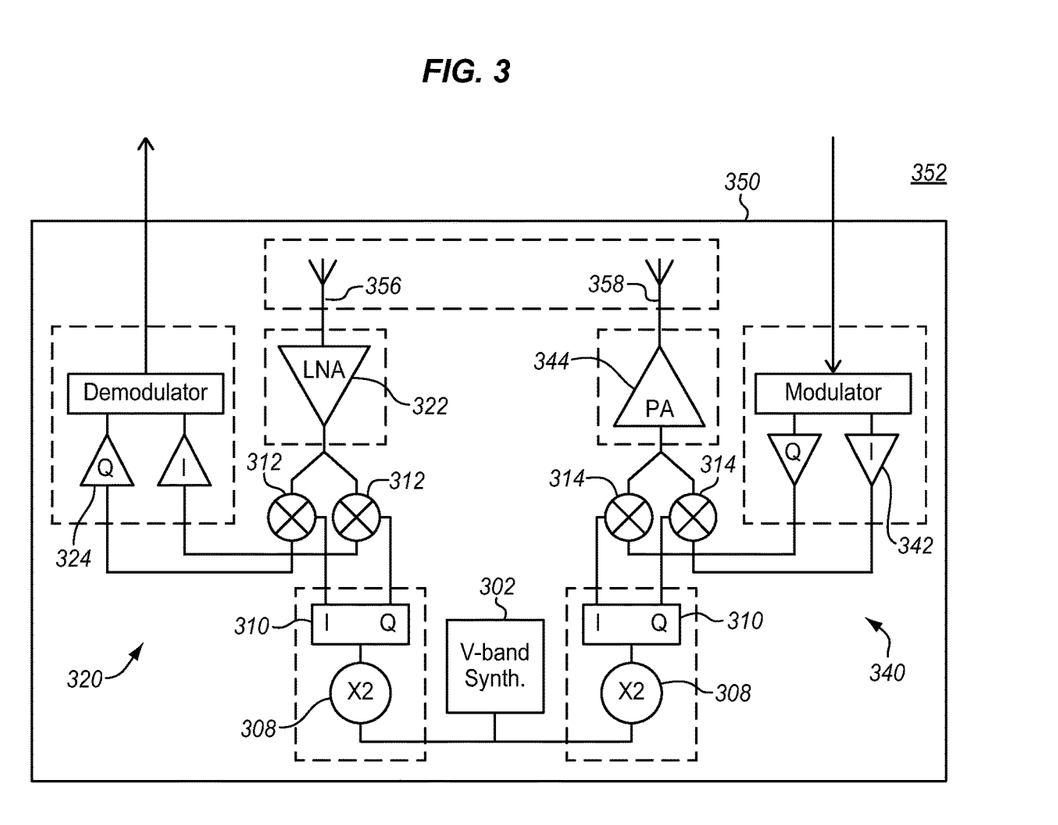
FIG. 3 is a block diagram of a radio chip and related components according to an embodiment.

FIG. 3 is a block diagram of an example of a transceiver or radio chip system architecture and connected components that may be used for the wireless interconnect described herein. The transceiver chip may take a variety of other forms and may include additional functions, depending on the particular implementation. This radio design is provided only as an example. The radio chip 350 is mounted to the package substrate 352 to which the primary integrated circuit die or chip 202, 203 is also mounted as shown in FIG. 1. The substrate 352 is mounted to the PCB or motherboard. The radio package may include a local oscillator (LO) 302 or a connection to an external LO and optionally a switch that allows the external LO feed to be used instead of or in addition to the internal LO. The LO signal may pass an amplifier and multiplier, such as an active doubler 308 and 0/90° quadrature hybrids 310 to drive an upconverter and mixers 314.

The RX (receive) chain 320 may contain a receive antenna 356 in the package coupled to a low noise amplifier (LNA) 322 and a wideband baseband (BB) amplification chain 324 with downconverters 312 for analog to digital conversion. The TX (transmit) chain 340 may include a BB digital driver chain 342 to the upconverters 314, and a power amplifier (PA) 344 to the transmit antenna 358. There may be multiple transmit and receive chains to transmit and receive over multiple channels simultaneously. The various channels may be combined or consolidated in different ways, depending on the particular implementation.

The TX and RX chains are both coupled through the substrate to the antenna. There may be a single antenna for TX and RX or there may be separate RX and TX antennas as shown. The antennas may be designed to have different radiation patterns to suit different wireless connections. In the example of FIG. 2, the first chip's antenna 216 has a wide beam transmit and receive pattern 330. This may allow the chip to communicate with multiple antennas in different locations on the motherboard. The second chip's antenna 218, on the other hand has a narrow beam transmit and receive pattern 332. This allows power to be concentrated in a single direction for communication with just one other device.

Figure 4:
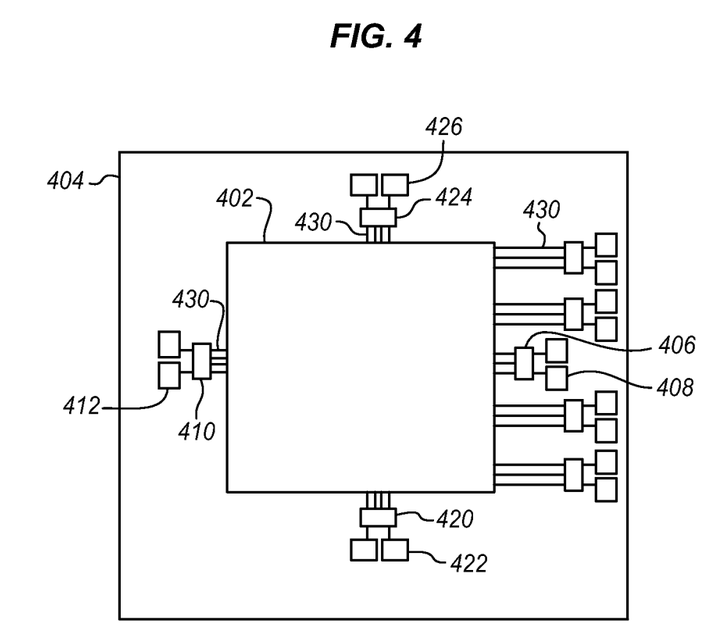
FIG. 4 is a top view diagram of a package with multiple wireless interconnects for chip-to-chip communications according to an embodiment.

FIG. 4 is a top view diagram of an example of an implementation of multiple wireless interconnects on a single microserver package. In this example, separate antennas are used to transmit and receive, but it is also possible to share the antenna between the Tx and the Rx chains. The antenna size may vary from 1.25×1.25 mm or less to 2.5×2.5 mm or more depending on the carrier frequency, desired gain, and transmission range.

A single integrated circuit chip or die 402 includes both processing and baseband systems and is mounted to a package 404. The baseband sections of the chip are coupled through on package traces 430 to radio chips or dies which are in turn coupled through the package to antennas. In this example, the die integrated circuit chip is a CPU for a microserver and is rectangular. There are radio chips on each of the four sides of the CPU. The sides shown as top, left, and bottom in the drawing figure each have a respective radio 424, 410, 420 coupled to a respective Tx, Rx antenna pair 426, 412, 422. The side shown as the right side shows five radios each connected to a respective antenna pair. The number of radios and antennas on each side may be determined based on communication rate needs in each direction.

Very few high speed links may be required on a microserver package. A single link is able to deliver data rates in excess of 40 Gb/s across a distance of a few cm. The data rate may still be on the order of 5-10 Gb/s for transmission distances of up to 50 cm.

FIG. 4 shows many wireless links implemented on the same side of one package. This allows the aggregate data rate to be increased. Alternatively, the data may be sent to different other devices that are in the same general direction. Both the radio chips and the antennas are placed towards the edge of the package to limit obstructions in the radio path that may come from heat sinks and heat spreaders. In general the losses for a copper trace baseband signal are much lower than the losses through the same copper trace for an RF signal. As a result, the radio chips may be kept very close to the antenna. This limits electrical signal and power losses due to the RF routing through the substrate. The radio chip may be installed onto the package in any manner desired and may even be embedded in or a part of the substrate. By using multiple radios, the on-package millimeter-wave wireless interconnects can be scaled for extremely high data rate applications. This may be useful in systems such as servers and media recording, processing, and editing systems. As shown, multiple links can be put together to achieve data-rates close to a Tb/s.

Figure 5:
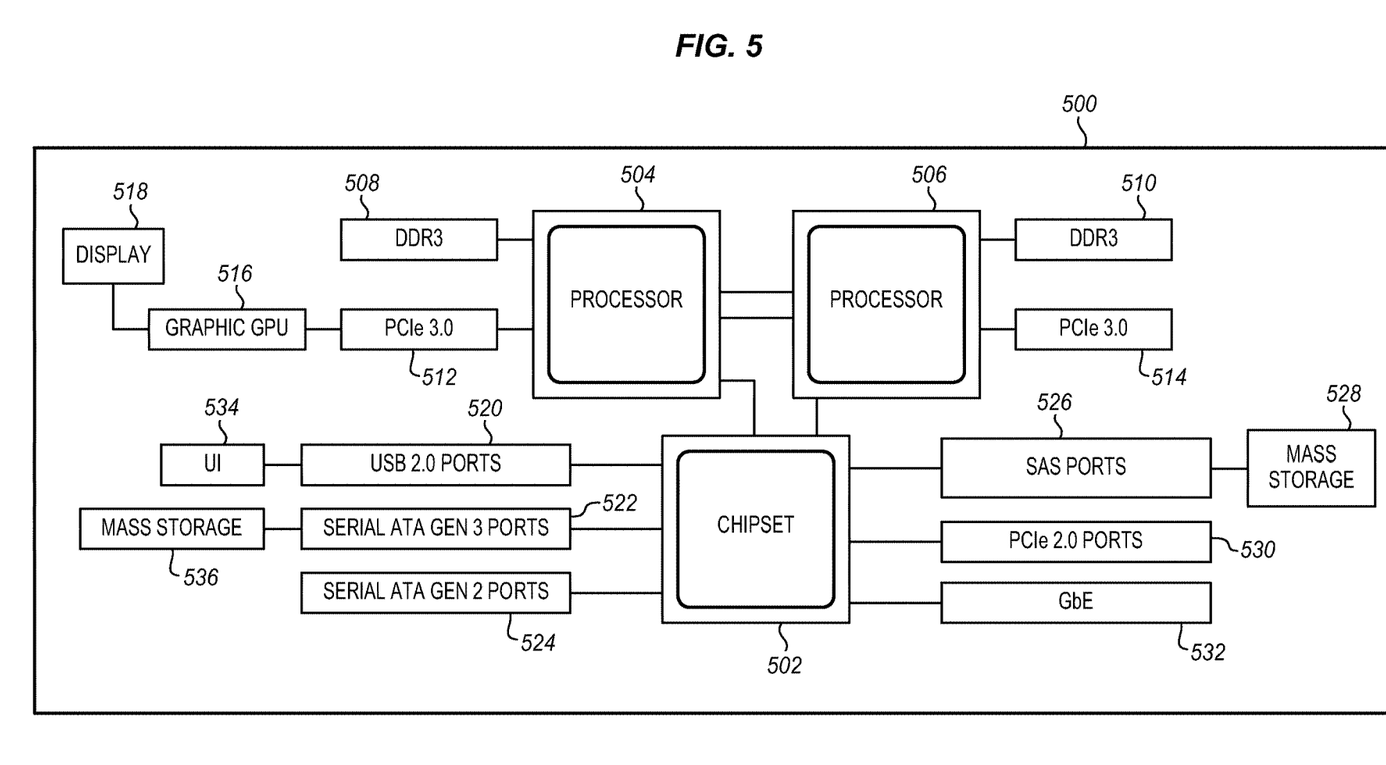
FIG. 5 is block diagram of a computing system with multiple high speed interfaces according to an embodiment.

FIG. 5 is a block diagram of a computing system 500 with multiple high speed interfaces that may be implemented using the wireless connections as described herein. The computing system may be implemented as a server, microserver, workstation, or other computing device. The system has two processors 504, 506 having multiple processing cores although more processors may be used, depending on the particular implementation. The processors are coupled together through a suitable interconnect such as the wireless interconnect described herein. The processors are each coupled to a respective DRAM (Dynamic Random Access Memory) module 508, 510 using a suitable connection, such as the wireless connection described herein. The processors are also each coupled to a PCI (Peripheral Component Interconnect) interface 512, 514. This connection may also be wired or wireless.

The PCI interfaces allow for connections to a variety of high speed additional components such as graphics processors 516 and other high speed I/O systems for display, storage and I/O. The graphics processor drives a display 518. Alternatively, the graphics processor is core or a die within one or both of the processors. The graphics processor may also be coupled to a different interface through a chipset.

The processors are also both coupled to a chipset 502 which provides a single point of contact for many other interfaces and connections. The connection to the chipset may also be wired or wireless, one or both of the processors may be connected to the chipset, depending on the implementation. As shown, a processor 504 may have a wireless connection to one or more processors 506, memory 508, peripheral components 512, and a chipset 502. These connections may all be wireless as suggested by the multiple radio and antennas of FIG. 4. Alternatively, some of these connections may be wired. The processor may have multiple wireless links to the other processor. Similarly the chipset 502 may have wireless connections to one or more of the processors as well as to the various peripheral interfaces as shown.

The chipset is coupled to USB (Universal Serial Bus) interface 520 which may provide ports for connections to a variety of other devices including a user interface 534. The chipset may be connected to SATA (Serial Advanced Technology Attachment) interfaces 522, 524 which may provide ports for mass storage 536 or other devices. The chipset may be connected to other high speed interfaces such as a SAS (Serial Attached Small computer serial interface) interface 526 with ports for additional mass storage 528, additional PCI interfaces 530 and communications interfaces 532, such as Ethernet, or any other desired wired or wireless interface. The described components are all mounted to one or more boards and cards to provide the described connections.

Figure 6:
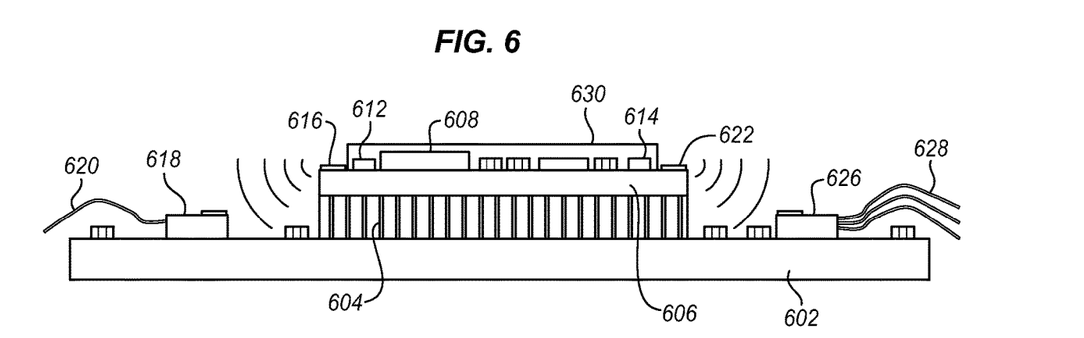
FIG. 6 is a cross-sectional side view diagram of a package on a system board with millimeter wave connectors according to an embodiment.

FIG. 6 is a cross-sectional side view diagram of a millimeter wave connector on a package substrate using two different approaches for coupling to other devices. A system board 602 supports a package substrate 606 through an optional socket 604. The package substrate carries one or more dies 608 such as a CPU or other processor, a co-processor, and any associated components such as memory, input/output interfaces, etc. The package includes a radio die 612 near an edge of the packet substrate as described above. There may be many more radio dies as discussed above and a second radio die 614 is shown on the opposite edge of the substrate. In this particular type of package an integrated heat spreader (IHS) 630 is attached over the top of the die to conduct heat away from the package. However the package may be finished in any way, depending on the implementation. This internal heat sink 630 may be constructed to stop short of the radios 612, 614 so that the radios are not covered in the same way that the antennas 616, 622 are not covered by the heat sink. 630

The radio die 612 as shown on the left is coupled to a radiating element 616 such as a focused directional antenna for millimeter wave transmit and receive. A millimeter wave connector 618 is mounted to the system board 602 near the antenna 616 and in the direct line of sight of the antenna to receive millimeter wave signals from the antenna and to direct millimeter wave signal to the antenna. While the connector is shown as being mounted directly to the system board, it may alternatively, be mounted to a support stand to carry the connector at a selected distance from the top of the system board 602. The connector may alternatively be mounted to a similar stand-along package 606 like that shown containing a plurality of memory dies, a graphics card, or an FPGA. The distance or standoff may correspond to the distance of the radiating elements from the top of the system board. The antennas may be configured to direct the modulated data signals downwards or upwards or sideways from the package substrate as well as laterally away from the package substrate depending on the position of the connector.

With the millimeter-wave connector 618 mounted directly to the system board, the additional operations of fabricating and mounting the standoff are avoided. The radiating element may then be configured to direct the signals downwards toward the connector. This presents some benefits in simplicity. However the connector may be farther from the radiating element and its construction may be more complex. The particular design and location of the connector and radiating element may be adapted to suit different implementations.

Figure 7:
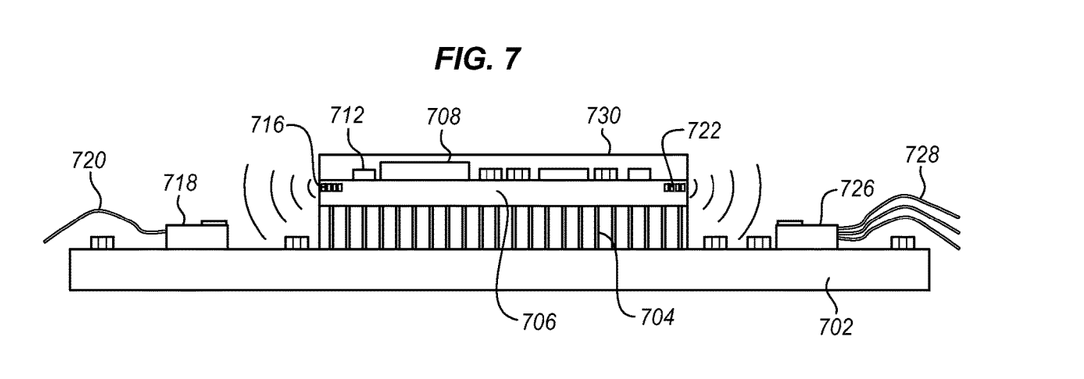
FIG. 7 is a cross-sectional side view diagram of a second example of a package on a system board with millimeter wave connectors according to an embodiment.

In order to increase the signal density antennas may be stacked within the package substrate or a first antenna may be within the substrate as shown for example in FIG. 7 and a second may be placed on top of the package substrate as shown in FIG. 6. The antennas may be configured so that the lower antenna is directed downward and the upper antenna is directed upward or sideways. Corresponding connectors may then be stacked with two different standoffs or offsets from the surface of the system board so that one is coupled to the lower antenna and the other is coupled to the upper antenna.

The connector 618 includes an optical module and is directly coupled to one or more optical fibers 620 which carry the millimeter wave signal to another device. At the other end of the fibers another connector may couple the millimeter wave signals to another chip package similar to the one illustrated.

The radio die 614 shown on the right side of the package is also coupled to a radiating element 622 on top of the substrate similar to the one on the opposite side. A millimeter wave connector 626 is also mounted to the system board a short distance away from the antenna as on the left side. The millimeter wave connector 626 may be an OPIO or other connector that is coupled to one or more cables such as a flex cable 628 to conduct the radio signals to and from the radio 614.

The connector may be active containing its own RF die coupled to a power source to extract the baseband signal with the data and to then retransmit and remodulate that signal as an optical or electrical signal. Alternatively, the connector may have an active repeater or amplifier that operates without demodulating the received millimeter wave signal.

FIG. 7 is a cross-sectional side view diagram of a second example implementation of a wireless connector system for a chip package. One or more dies 708, passives and other components are attached to a package substrate 706 and optionally covered by an integrated heat spreader 730, mold compound, or other material or structure. The package is coupled to a system board 702 directly or optionally through a socket 704 as shown. The package includes radio dies 712, 714 coupled to one or more of the dies 708 through the package substrate. The connection is typically through traces on the top surface of the substrate but may be in any other way. The radios receiver power through the substrate and communicate data to and from the die 708 through the substrate. The radios modulate the data onto a carrier which is coupled to antennas 716, 722 or radiating elements to radiate the modulated data to another device and to receive modulated data from the other device.

In the example of FIG. 7, the left side 716 and right side 722 radiating elements are formed within the layers of the package substrate 706 instead of being formed over the top of the package. The conductive traces between the radio die and the radiating elements may be at the level of the radiating elements or across the top of the substrate or both. Metal layers of the package substrate may be used to connect to the radio. This approach allows more space to be available on the top of the substrate for other purposes. It may also allow the heat spreader 730 or another cover to completely cover the top of the package without interfering with the antennas.

These radiating elements 716, 722 are nevertheless configured to direct the modulated data laterally away from the side of the substrate. This is the same direction used by the radiating elements of FIG. 6. The modulated data for the left side antennas is coupled into an OPIO 718 which couples the data into optical fibers 720. Alternatively, the modulated data may be coupled into some other stand-alone module, such as a memory stack, an FPGA, or a graphics module instead of coupling into a cable to a remote component. The modulated data for the right side antenna is coupled to another connector 726 which couples data into electrical wire cables 728. The data may be communicated from these connectors over the associated links to a nearby chip package with its own radio and antennas or to any other desired communication node.

The illustrated millimeter wave connectors 618, 622, 718, 722 may be used as a direct replacement for the directly connected electrical connectors, but without requiring direct contact with the package. As a result, the die package 606 may be removed and replaced or re-socketed without affecting the fiber or wire connections. The millimeter wave connectors may be active containing an internal RF die which extracts the baseband signal from the received millimeter wave modulated signal and transmits that data over the optical fiber or an electrical (coax-like) cable.

Figure 8:
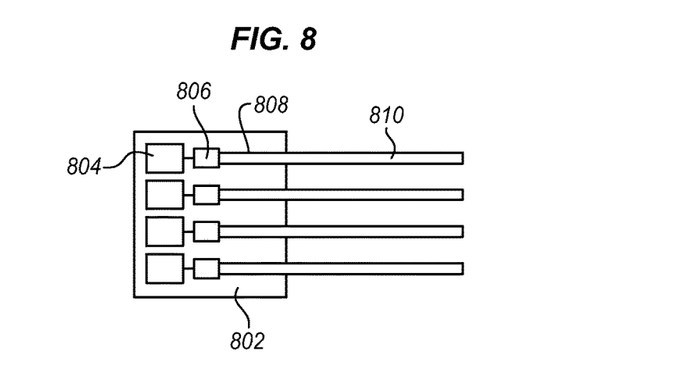
FIG. 8 is a top view diagram of a millimeter wave connector according to an embodiment.

FIG. 8 is a top view diagram of a millimeter wave connector suitable for use in the diagrams as shown. The connector is built on a substrate 802 which may be formed of any dielectric material. A moderately flexible dielectric such as polyimide may be used or a more rigid material such as glass or silicon oxide may be used. The substrate is adapted to be fastened to the package substrate or to a support stand. This may be done using removable fasteners (not shown) or an adhesive. The connector can be assembled to the package substrate through guide pins, a clamp mechanism, or any of a variety of other ways, depending on the particular implementation.

At one side and along the edge of the substrate 802, the connector has a series of radiating elements 804 or antennas. These may be formed in the substrate as slotted waveguide antennas, as deposited metal structures, as microstrip, or in any other suitable way. These antennas communicate with the antennas of the chip package to receive and transmit the modulated data signals from the chip package. The antennas may be formed by applying a conductive element to the surface of the substrate. This may be done by deposition, or using an adhesive with pre-formed materials. The antennas may be formed from copper, aluminum, or any other suitable conductive material.

The radiating elements each have a trace or wiring element to connect to a respective radio frequency (RF) die. The RF dies demodulate the received signal extract the baseband data and then coupled it to a respective copper conductor 808 which is then coupled to a cable 810, such as flex cable. For the OPIO, the RF die is coupled to an optical modulator that couples the signal to an optical fiber.

Figure 9:
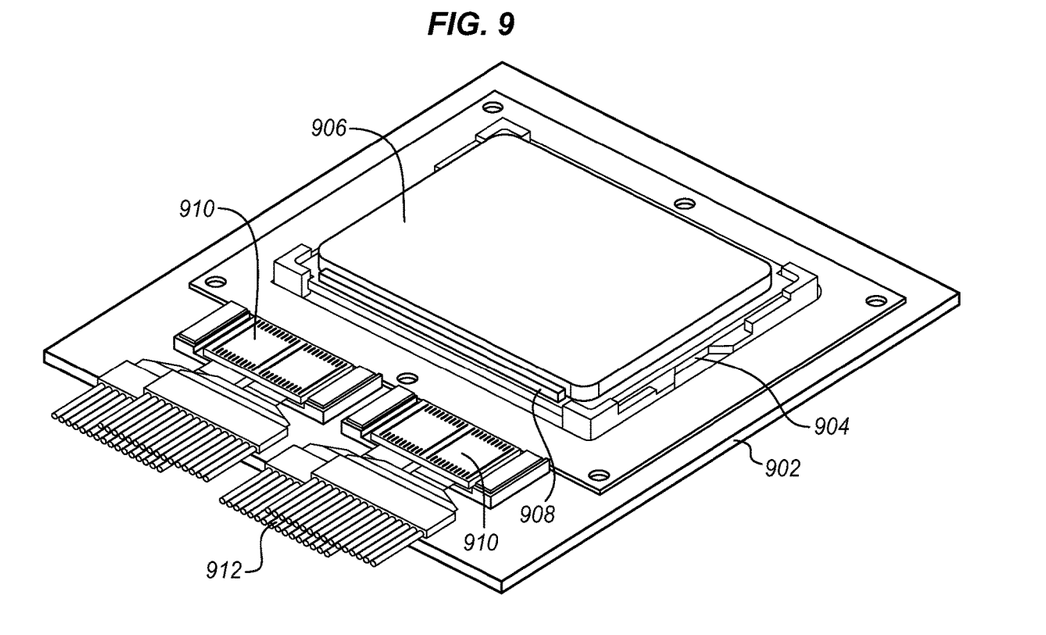
FIG. 9 is an isometric view diagram of a package on a system board with millimeter wave connectors according to an embodiment.

FIG. 9 is an isometric view of a portion of a system board 902 with a wireless cable connector. A socket 904 is mounted to the system board with a semiconductor chip package 906 mounted in the socket. Only a small section of the system board is shown there may be many other components mounted to the same system board. A set of radio transceivers 908 is mounted to one side of the package substrate along an edge. These transceivers may include radio dies and radiating elements coupled to one or more larger semiconductor chips of the package as described above. The radio transceivers may use multiple channels and carrier within a millimeter wave band to send and receive data with one or more other devices. While this example shows transceivers on only one edge of the package, more edges and even all package edges may have radio transceivers, depending on the implementation.

Wireless cable connectors 910 are mounted to the system board proximate the radio transceivers. These cable connectors may take the form of those shown in FIG. 8 with one or more radio antennas coupled to one or more RF dies coupled in turn to the cables 912. As mentioned above, an optical fiber interface may be used instead of the cable interface. As shown multiple cables may be used. The cable may all connect to the same remote component in order to provide for high data rates. Alternatively some of the cables may connect to different remote components so that the integrated circuit chip packet has connections to many different remote components. The remote component may be another chip or a communications hub or backplane.

As shown in FIG. 9, the socket 904 and the package 906 are physically separate and apart from the connectors 910. As a result, the package and even the socket may be removed and replaced without affecting the connectors. The package may be designed and fabricated without regard for the type, size, and number of cables. The same package may be used for flex cable as for optical fiber connectors. This allows a single package design to be used in many different system configurations.

Figure 10:
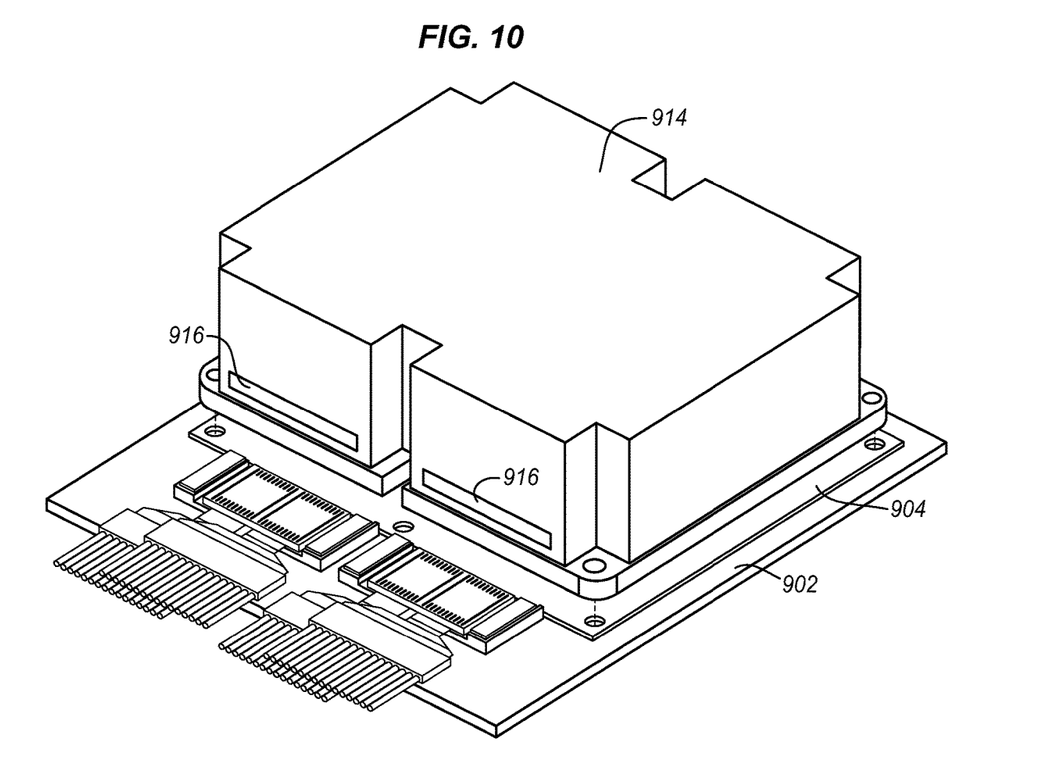
FIG. 10 is an isometric view diagram of a package with a cover on a system board with millimeter wave connectors according to an embodiment.

FIG. 10 is an isometric view of the same components as in FIG. 9 with a heat sink or cover 914 shown above the package substrate 902 and ready to be added to the assembly over the package 906 and attached to the socket 904 using screws (not shown) or some other fastener. The heat sink may be provided with a window 916 in the position between the radio transceivers 908 and the connectors 910. The window may be a special insert made from a material that is transparent to millimeter wave radio carriers or it may be a slot or reveal cut out of the heat sink. Alternatively, the entire heat sink may be constructed of a material that is transparent to millimeter wave radio signals.

As shown, the socket, package, and any cooling solution or cover can be assembled in a separate operation from connecting the cables. Customers or users can install cable assemblies as desired without having to interfere with the package. In addition to being easier to connect and install the cables, it is also easier to design a system using the radio connectors. The design risks from the package and connector interaction is taken out of the consideration because there is no direct physical interaction. Furthermore, it becomes much easier to design a cable (optical or copper) management or retention mechanism. In addition, the system is more scalable. As an example, packages can be manufactured with the capability to support higher bandwidth external communications. Customers may then install cable assemblies to meet their bandwidth requirements and system architecture. Customers may also upgrade cable assemblies later to higher data rates or bandwidths without affecting the installed package.

Figure 11:
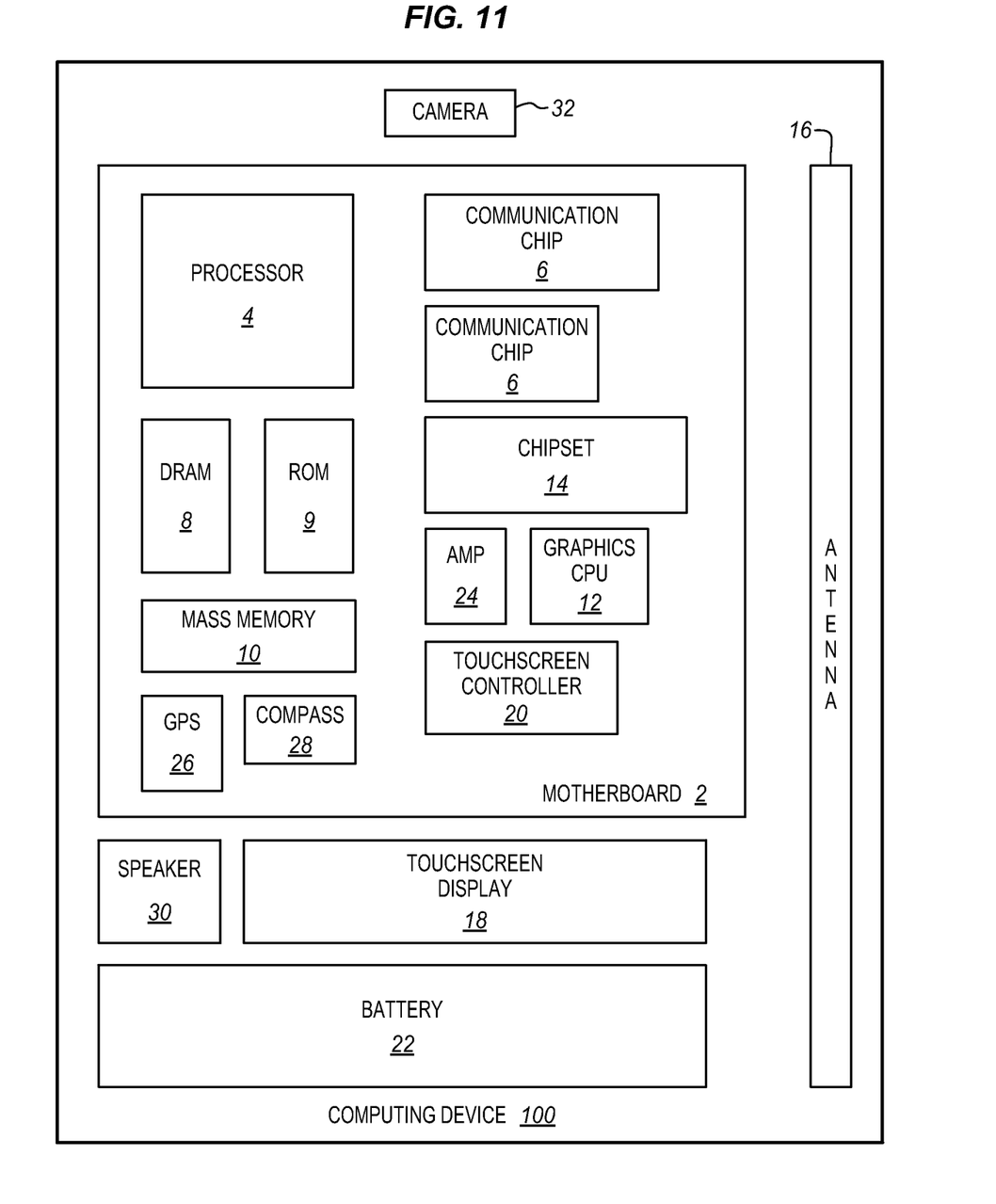
FIG. 11 is a block diagram of a computing device incorporating wireless interfaces according to an embodiment.

FIG. 11 illustrates a computing device 100 in accordance with another implementation. The computing device 100 houses a board 2. The board 2 may include a number of components, including but not limited to a processor 4 and at least one communication chip 6. The processor 4 is physically and electrically coupled to the board 2. In some implementations the at least one communication chip 6 is also physically and electrically coupled to the board 2. In further implementations, the communication chip 6 is part of the processor 4.

Depending on its applications, computing device 11 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication chip 6 enables wireless and/or wired communications for the transfer of data to and from the computing device 11. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 11 may include a plurality of communication chips 6. For instance, a first communication chip 6 may be dedicated to shorter range wireless communications such as Wi-Fi and Bluetooth and a second communication chip 6 may be dedicated to longer range wireless communications such as GPS, EDGE, GPRS, CDMA, WiMAX, LTE, Ev-DO, and others.

In some implementations, any one or more of the components may be adapted to use the wireless connection described herein. The features of the system of FIG. 11 may be adapted to that of FIG. 7 and vice versa. For example, the system of FIG. 11 may carry multiple processors. The system of FIG. 7 may include any one or more of the peripherals shown in FIG. 11. The term "processor" may refer to any device or portion of a device that processes electronic data from registers and/or memory to transform that electronic data into other electronic data that may be stored in registers and/or memory.

In various implementations, the computing device 11 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 11 may be any other electronic device that processes data including a wearable device.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to an apparatus that includes a system board, an integrated circuit chip, a package substrate mounted to the system board to carry the integrated circuit chip, the package substrate having conductive connectors to connect the integrated circuit chip to external components, a radio on the package substrate coupled to the integrated circuit chip to modulate the data onto a carrier and to transmit the modulated data, a radio on the system board to receive the transmitted modulated data and to demodulate the received data, and a cable interface coupled to the system board radio to couple the received demodulated data to a cable.

In further embodiments the cable is a multiple conductor flex cable.

In further embodiments the cable is at least one coaxial conductor.

In further embodiments the cable is an optical fiber.

Further embodiments include an optical fiber modulator coupled to the radio to receive the demodulated data and to modulate the received demodulated data onto an optical fiber.

In further embodiments the system board radio includes a plurality of radiating elements, a plurality of radio dies each coupled to a respective radiating element to demodulate data received at the radiating element, and a plurality of cables, each coupled to a respective radio die.

Further embodiments include a plurality of optical modulators and wherein the radio dies are each coupled to a cable through an optical modulator.

In further embodiments the system board radio comprises a plurality of radio dies, the apparatus further comprising a dielectric substrate having a series of antennas each having a wiring element to connect to a respective radio die, each radio die being coupled to a respective cable.

In further embodiments the series of antennas are formed as slotted waveguide antennas using metal structures deposited on the dielectric substrate.

Further embodiments include a heat sink over the integrated circuit chip and the package substrate, the heat sink having a window between the radio on the package substrate and the system board radio.

Further embodiments include traces on the package substrate to connect the integrated circuit chip to the radio on the package substrate.

In further embodiments the radio on the package substrate is formed within layers of the package substrate and is connected to the package substrate through metal layers of the package substrate.

Some embodiments pertain to a computing device that includes a system board, a central processing unit (CPU), a package substrate mounted to the system board to carry the CPU, the package substrate having conductive connectors to connect the CPU to external components, a radio on the package substrate coupled to the CPU to modulate the data onto a carrier and to transmit the modulated data, a radio on the system board to receive the transmitted modulated data and to demodulate the received data, a cable interface coupled to the system board radio to couple the received demodulated data to a cable, and a chipset carried by the system board coupled through the system board to the integrated circuit chip through the package.

Further embodiments include a second CPU, a second package substrate mounted to the system board to carry the CPU, a second cable interface to receive the demodulated data from the first CPU from the cable, and a second system board radio to modulate the received data from the second cable interface onto a carrier and transmit the modulated data to a second radio on the second package substrate, the second radio on the package substrate to demodulate the data from the carrier and to transmit the demodulated data to the second CPU.

Further embodiments include an optical fiber modulator coupled to the radio to receive the demodulated data and to modulate the received demodulated data onto an optical fiber.

In further embodiments the system board radio comprises a plurality of radio dies, the apparatus further comprising a dielectric substrate having a series of antennas each having a wiring element to connect to a respective radio die, each radio die being coupled to a respective cable.

In further embodiments the series of antennas are formed as slotted waveguide antennas using metal structures deposited on the dielectric substrate.

Some embodiments pertain to an apparatus that includes a system board, an integrated circuit chip package mounted to the system board having an integrated circuit chip, a radio and conductive connectors to connect the chip to the radio, the radio to modulate data from the chip onto a carrier and to transmit the modulated data away from the package, the radio further to receive modulated data, to demodulate the received data and to transmit the demodulated data to the chip, a radio on the system board to receive the transmitted modulated data and to demodulate the received data, a first cable interface on the system board to receive the transmitted demodulated data from the system board radio and to couple the received demodulated data into a cable, and a second cable interface coupled to the cable to connect the received demodulated data in the cable to a remote device.

In further embodiments the remote device comprises a radio to transmit the data to a second integrated circuit chip package.

Further embodiments include a dielectric substrate attached to the system board, having a radiating element facing the package radio, the system board radio and the first cable interface, the substrate further being attached to an end of the cable.

In further embodiments, the package includes a plurality of additional radios connected to the chip to transmit data to a plurality of different external components.

The invention claimed is:

1. An apparatus comprising:
    a system board;
    an integrated circuit chip;
    a package substrate mounted to the system board to carry the integrated circuit chip, the package substrate having conductive connectors to connect the integrated circuit chip to external components through the system board;
    a first radio on the package substrate coupled to the integrated circuit chip to modulate data onto a carrier and to transmit modulated data;
    a second radio on the system board to receive the transmitted modulated data and to demodulate the transmitted modulated data, wherein the second radio on the system board receives the transmitted modulated data wirelessly from the first radio on the package substrate; and
    a cable interface coupled to the second radio to couple the demodulated transmitted modulated data to a cable.

2. The apparatus of claim 1, wherein the cable is a multiple conductor flex cable.

3. The apparatus of claim 1, wherein the cable comprises at least one coaxial conductor.

4. The apparatus of claim 1, wherein the cable comprises an optical fiber.

5. The apparatus of claim 4, further comprising an optical fiber modulator coupled to the second radio to receive the demodulated transmitted modulated data and to modulate the received demodulated transmitted modulated data onto an optical fiber.

6. The apparatus of claim 1, wherein the second radio comprises:
    a plurality of radiating elements;
    a plurality of radio dies each coupled to a respective radiating element to demodulate data received at the radiating element; and
    a plurality of cables, each coupled to a respective radio die.

7. The apparatus of claim 6, further comprising a plurality of optical modulators and wherein the radio dies are each coupled to a cable through an optical modulator.

8. The apparatus of claim 1, wherein the second radio comprises a plurality of radio dies, the apparatus further comprising a dielectric substrate having a series of antennas each having a wiring element to connect to a respective radio die, each radio die being coupled to a respective cable.

9. The apparatus of claim 8, wherein the series of antennas are formed as slotted waveguide antennas using metal structures deposited on the dielectric substrate.

10. The apparatus of any claim 1, further comprising a heat sink over the integrated circuit chip and the package substrate, the heat sink having a window between the first radio on the package substrate and the second radio.

11. The apparatus of claim 1, further comprising traces on the package substrate to connect the integrated circuit chip to the first radio on the package substrate.

12. The apparatus of claim 1, wherein the first radio on the package substrate is formed within layers of the package substrate and is connected to the package substrate through metal layers of the package substrate.

* * * * *